UNITED STATES PATENT OFFICE.

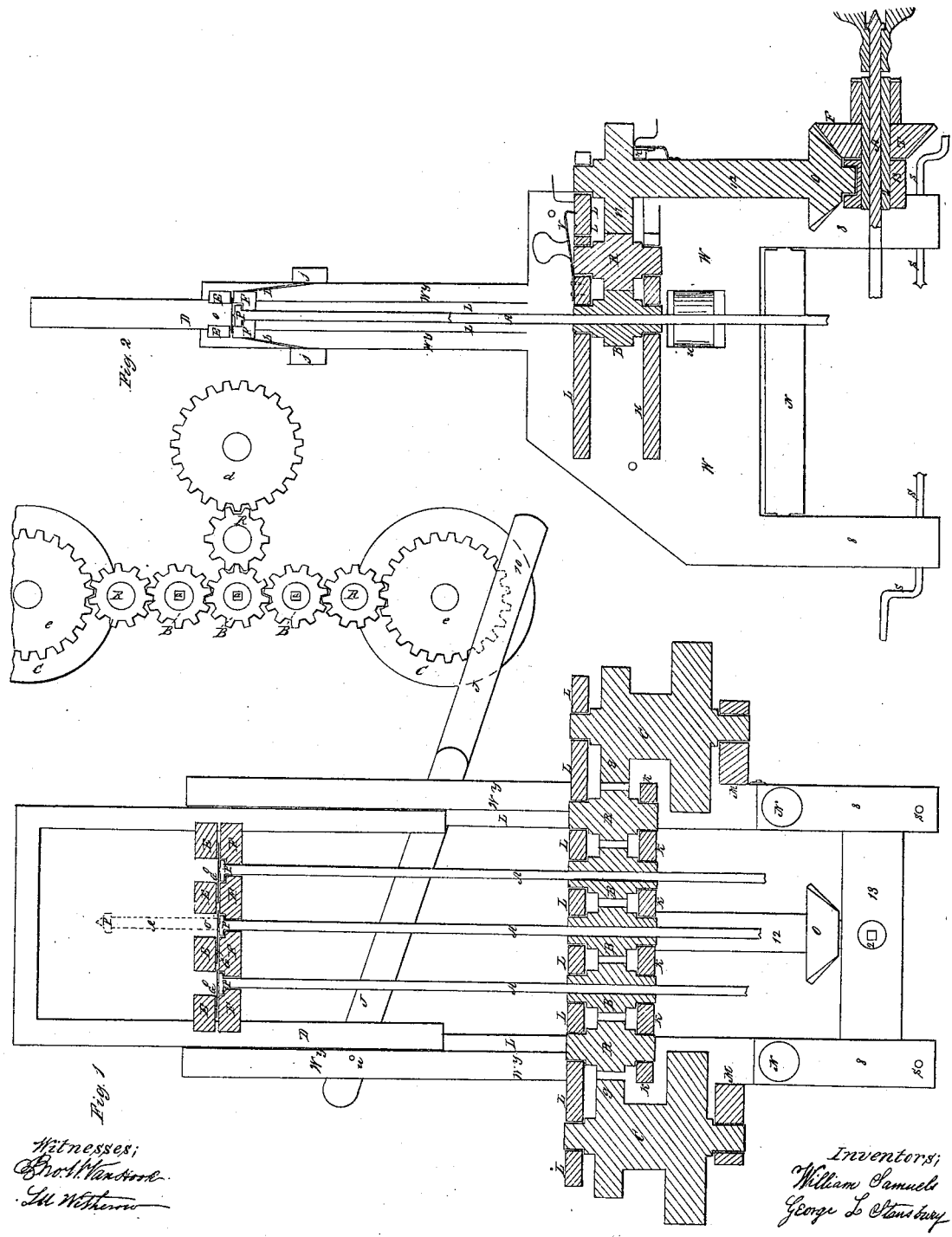

WM. SAMUELS AND GEO. L. STANSBURY, OF JACKSON TOWNSHIP, JAY COUNTY, INDIANA.

BORING-MACHINE.

Specification of Letters Patent No. 15,022, dated June 3, 1856.

*To all whom it may concern:*

Be it known that we, WILLIAM SAMUELS and GEORGE L. STANSBURY, of Jackson township, county of Jay, and State of Indiana, have invented a new and useful Machine for Boring Framing or any other Timber, which we term a "Power Boring-Machine;" and we do hereby declare that the following is a full, clear, and exact description of the construction and operation of the same, reference being had to the annexed drawing, making a part of this specification, in which—

Figure 1, is an inner sectional view showing the connection of the power applied and its use on propelling the machine. Fig. 2, is an inner view showing the extension of power and its working. Fig. 3, is a vertical view showing the connection of its several wheels and their relative position.

In Fig. 1, C, C, represent two belt wheels, to which the power is applied; but one is used at a time, the object of two is to enable the operator to change the machine thus working on either side of the machine or timber.

W, Y, Figs. 1 and 2 is the frame which is to be made of cast iron or any metal desired. 8, 8, is a part of said frame which extends down the side of the timber and fastened by means of the set screws, S, S.

9, 9, is a cog wheel connected with the belt wheels C, C, by a shaft thereby receiving all the power direct from the belt wheels. This power is communicated from one to the other of the several cog wheels R, B, B, B, R, &c. The cog wheels B, B, B, have a square mortise (*a, a, a,* Fig. 3) through the center of the respective shafts, through which mortises are passed the augers A, A, A, (Fig. 1) which have a square shaft or shank fitting the mortises. With the power given or communicated by the belt wheel, C, and extended to B, B, B, the augers are made to revolve, the part of which augers revolve a contrary way and require to be made of the reverse twist on the cutting end. By means of the sash D (Fig. 1) and lever J the augers are forced into the timber while in motion, F being a cross piece in the sash D, through which the augers pass and in which they are made to revolve at the upper side and sunk into the cross piece. The auger is fastened into a round plate of iron by a thread cut on the end of the auger. The round plate *p*, forms a heading or shoulders on the auger to keep it from falling down out of its place and to assist in raising the augers out of the holes after being bored. The auger A, has a pivot point above the round plate and turns against a steel plate G, G, G. The plates G, are movable and draw out so as to allow the auger to pass up through the upper crosspiece E, through the opening O, as the sash is forced down, thus leaving some of the augers boring while those desired not to be allowed to pass as just described and as shown by I, the dotted lines. The sash D, is made to move up and down in a groove or in two grooves L cut in a part of the frame W, Y, (Figs. 1 and 2) by means of a lever J, which has its fulcrum at U, Fig. 1, the power being applied at 10. The lever is connected to the sash by means of two braces *b, b,* Fig. 2. The power given by the belt wheel C, is communicated to the cog wheel R, Fig. 2, and from thence to the cog wheel 11 Fig. 2, which is connected to a bevel cog wheel O by a shaft 12 Fig. 2 and has its lower bearing in a cross piece 13 fastened to the frame by screws or bolts. This bevel wheel O, connects with another bevel wheel T, Fig. 2, that works on a shaft 2 Fig. 2 of running through the cross piece 13 in which it has its bearing and is kept to its place by a strap of iron over its face. This shaft has like the cog wheels B a square mortise through the center A, Fig. 1 in which an auger is allowed to pass and by means of a slight pressure with the hand at the knob 6, Fig. 2, the auger is forced into the timber horizontally, thus boring the necessary draw bores.

The auger A, is fastened in the knob as was represented at the top of the perpendicular augers described above and has its bearing against a plate of steel *d* Fig. 2, fastened to the knob by wood screws. The cog wheels 9, 9, B, B, B, and R, R, Figs. 1, 2, and 3, have their upper bearing in a steel plate L, Figs. 1 and 2, and B, B, B, R, R, R, have their lower bearing in a steel plate K. The belt wheels C, C, have their lower bearing in a step M, screwed or bolted on the side of the frame W. The cog wheel 11 has its upper bearing in a separate piece of the plate L, marked L, L, which works in a groove at the inner side of the frame W, and is held to its place by a spring hook V, Fig. 2 in the niche *i*, Fig. 2. When the draw bore is not desired to run by raising the spring hook V, and slide the plate L, L, out, so that the connection between the cog wheels R and 11 is broken, let the spring hook strike in the niche S Fig. 2, which will hold it to its place and allow the other wheels to run while the draw-bores remain stationary.

U in Fig. 2 is the outer side of the belt wheel as seen through a mortise in the frame W.

N, N, are two rollers to enable the operator to move the machine from one mortise to another without raising the machine from the timber. By turning spool X on frame W, Fig. 2, will check or give the power the necessary cords being attached to said spools.

What we claim as our invention and desire to secure by Letters Patent is—

The power boring machine constructed as and for the purposes described in the foregoing specification.

WILLIAM SAMUELS.
GEORGE L. STANSBURY.

Witnesses:
JNO. W. VAN HOOK,
L. A. WITHERON.